United States Patent [19]

Choji

[11] Patent Number: 5,047,903
[45] Date of Patent: Sep. 10, 1991

[54] AERODYNAMIC VEHICLE HEADLAMP

[75] Inventor: Masataka Choji, Shizuoka, Japan

[73] Assignee: Koito Manufacturing Co., Ltd., Tokyo, Japan

[21] Appl. No.: 444,233

[22] Filed: Dec. 1, 1989

[30] Foreign Application Priority Data

Dec. 15, 1988 [JP] Japan ................................ 63-314938

[51] Int. Cl.⁵ .............................................. B60Q 1/00
[52] U.S. Cl. ...................................... 362/61; 362/268; 362/346; 362/331
[58] Field of Search ................... 362/61, 80, 268, 331, 362/308, 309, 296, 297, 298, 299, 344, 346, 347, 302, 304, 305

[56] References Cited

U.S. PATENT DOCUMENTS

| | | | |
|---|---|---|---|
| 1,235,297 | 7/1917 | Dillon | 362/334 |
| 4,249,232 | 2/1981 | Dick | 362/61 |
| 4,631,642 | 12/1986 | Brun | 362/32 |
| 4,670,818 | 6/1987 | Moebius | 362/80 |
| 4,731,706 | 3/1988 | Ricard | 362/61 |
| 4,839,785 | 6/1989 | Ohishi | 362/61 |
| 4,841,419 | 6/1989 | Ohishi | 362/226 |
| 4,860,173 | 8/1989 | Jocher et al. | 362/61 |
| 4,895,693 | 1/1990 | Suzuki et al. | 362/308 |

Primary Examiner—Ira S. Lazarus
Assistant Examiner—D. M. Cox
Attorney, Agent, or Firm—Sughrue, Mion, Zinn, Macpeak & Seas

[57] ABSTRACT

An aerodynamic vehicle headlamp having a lens cover of increased strength with no increased thickness and no reinforcing ribs. The headlamp includes a lamp housing, a reflector mounted in the housing, a projecting lens provided in front of the reflector near the light gathering region thereof, and a transparent lens cover sloping forward and disposed in front of the projecting lens and lying across the optical axis of the reflector and covering the front opening of the lamp housing. The lens cover has a curved portion corresponding to the effective light distribution region defined by the projecting lens and an annular wall extending from the surface of the lens cover, with the curved portion being surrounded by the annular wall.

18 Claims, 3 Drawing Sheets

AERODYNAMIC VEHICLE HEADLAMP

BACKGROUND OF THE INVENTION

The present invention relates to vehicle headlamps, and more particularly to a vehicle headlamp suitably applicable to a socalled "aerodynamic type headlamp" having a reduced thickness and improved aerodynamic properties.

In order to reduce the air resistance of a vehicle during travel, it is desirable to decrease the height of the vehicle body and to make the vehicle body smooth, i.e., to provide a streamlined vehicle body. Accordingly, the height of a headlamp installed on the vehicle body of this type should be made as small as possible and the headlamp installed on the sloped upper surface of the vehicle body. For this purpose, a recess is formed in front of the headlamp. The recess is covered with a lens cover having a curvature which is substantially equal to that of the vehicle body surface so that the air resistance due to the headlamp is minimized.

In the above-described headlamp, the lens cover is a transparent plate uniform in thickness, and therefore it is low in mechanical strength. This difficulty may be overcome by increasing the thickness of the lens cover. However, doing so is disadvantageous in that the increase in thickness of the cover lens results in an increase in the number of cover elements, that is, an increase in the weight of the headlamp. The mechanical strength may also be increased by providing ribs. However, the provision of the ribs makes the metal mold complicated in structure, thus increasing the manufacturing cost of the headlamp.

SUMMARY OF THE INVENTION

Accordingly, an object of the invention is to eliminate the above-described difficulties accompanying a conventional vehicle headlamp. More specifically, an object of the invention is to provide a vehicle headlamp having a simple construction in which the lens cover is increased in mechanical strength without increasing its wall thickness and without the use of ribs.

The foregoing and other objects of the invention have been achieved by the provision of a vehicle headlamp in which, according to the invention, a projecting lens is provided in front of a reflector near the light gathering region of the reflector, and a transparent lens cover sloping forwardly is disposed in front of the projecting lens in such a manner that the transparent lens cover lies across the optical axis and covers the front opening of a lamp housing, the lens cover having a curved portion in correspondence to the effective light distribution region defined by the projecting lens in such a manner that the curved portion is surrounded by an annular wall which extends from the surface of the lens cover.

In the vehicle headlamp of the invention, the annular wall surrounding the curved portion of the lens cover serves substantially as a rib for the lens cover, thus reinforcing the latter.

DESCRIPTION OF THE PREFERRED EMBODIMENTS

The invention will be described with reference to a preferred embodiment shown in the accompanying drawings.

Figure 1:
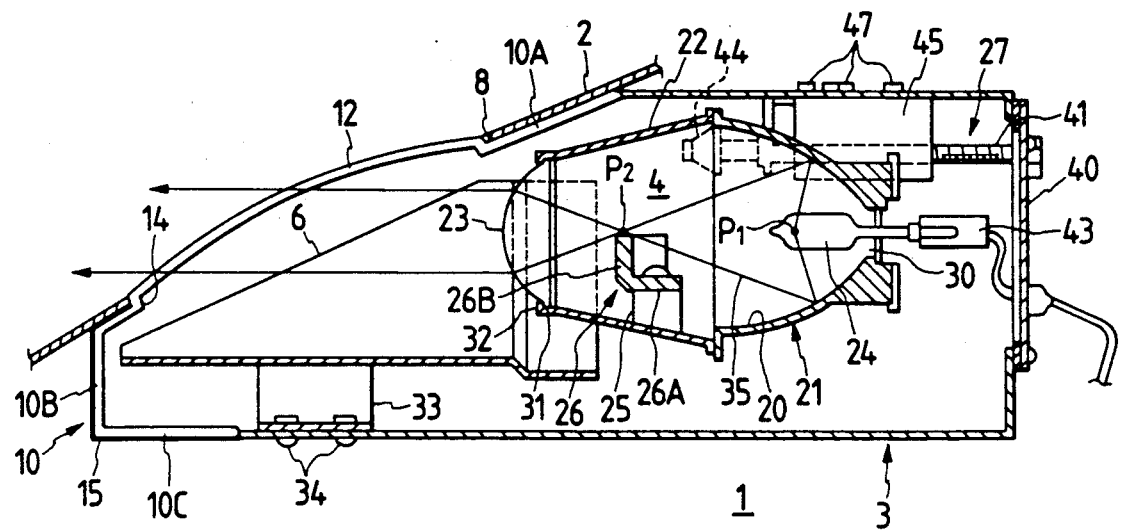
FIG. 1 is a sectional view taken along a line I—I in FIG. 2 showing an example of a vehicle headlamp constructed according to the invention.
Figure 3:
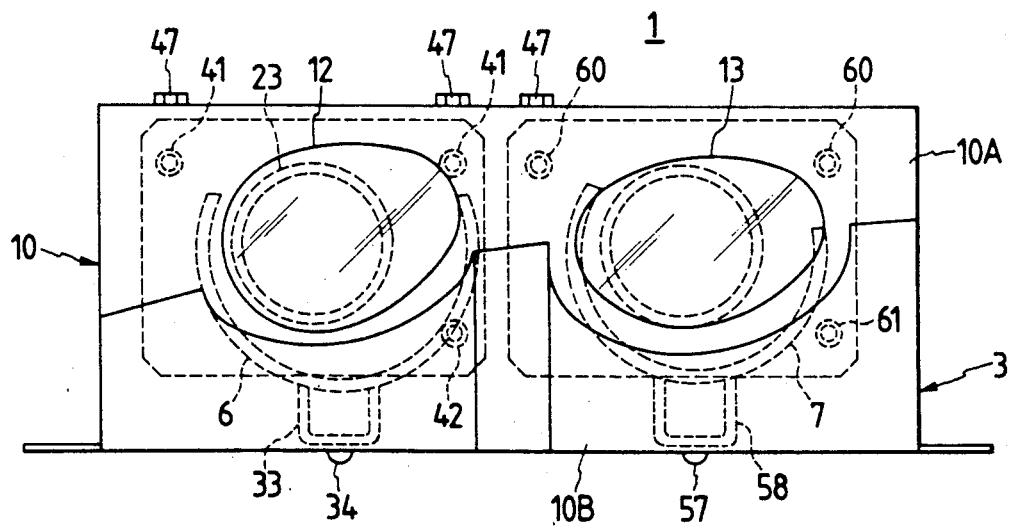
FIGS. 2 and 3 are a plan view and a front view, respectively, showing the vehicle headlamp of the invention.
Figure 2:
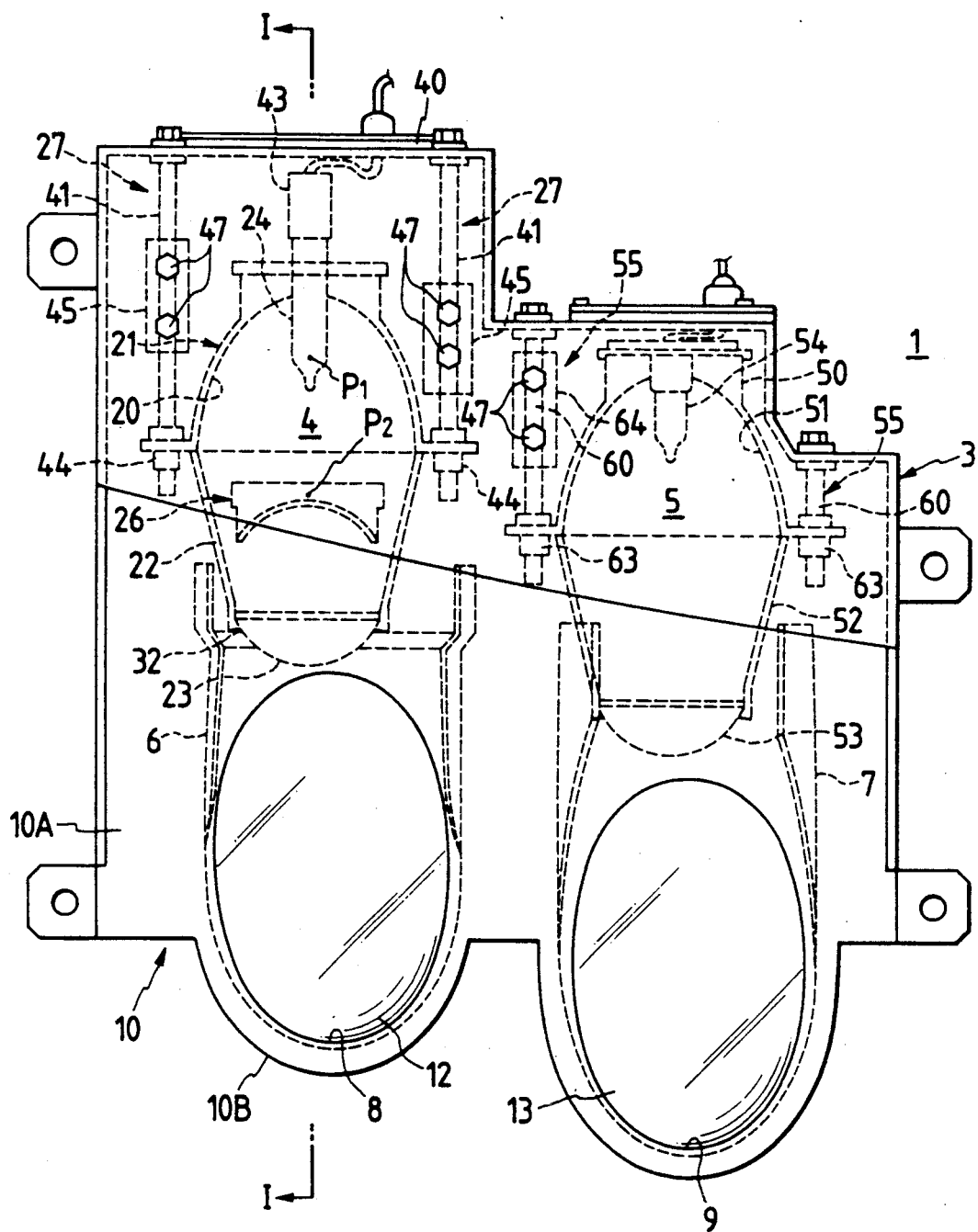

FIG. 1 is a sectional view taken along a line I—I in FIG. 2, showing an example of a vehicle headlamp according to the invention. FIGS. 2 and 3 are a plan view and a front view, respectively, showing the vehicle headlamp.

In FIGS. 1, 2 and 3, reference numeral 1 designates a vehicle headlamp according to the invention. The headlamp 1 has a lamp housing 3 which is located inside a vehicle body 2 on the right side of the front end portion. Two headlamp units 4 and 5 and their extensions 6 and 7 are juxtaposed in the lamp housing 3 in such a manner that they are adjacent to one another and offset from one another in the axial direction of the headlamp.

The portion of the vehicle body in which the headlamp 1 is installed is inclined forward at a predetermined angle, and has opening 8 and 9 which are elliptic in plan view and located in correspondence to the headlamp units 4 and 5.

The lamp housing 3 is open at the front end, and the opening is covered with a lens cover 10. The lens cover 10 is made of transparent resin material such as acrylic resin or glass. The lens cover 10 includes an upper surface portion 10A sloped along the vehicle body 2, a front surface portion 10B extending substantially vertically from the front edge of the upper surface portion 10A, and a lower surface portion 10C extending horizontally backward from the lower edge of the front surface portion. The upper surface 10A merges with curved portions 12 and 13, which are curved upwardly, and surrounds the latter. The curved portions 12 and 13 are elliptical in plan view and are of substantially the same size as the above-described opening 8 and 9. More specifically, the upper surface portion 10A merges with each of the curved portions 12 and 13 through an annular wall 14, the height of which is the same as the wall thickness of the vehicle body 2. The annular walls 14 thus provided reinforce the upper surface plate 10A to prevent the lens cover 10 from being damaged by vibration, collision, or other external force. The annular walls 14 are fitted in the openings 8 and 9 of the vehicle body from the inside so that the curved portions 12 and 13 protrude upward from the vehicle body. The surface of the lens cover 10, except the surfaces of the curved portions 12 and 13 which are covered by the vehicle body 2, is covered with a light shielding film 15.

Of the two headlamp units 4 and 5, the left one 4 positioned closer to the central axis of the vehicle body is mainly used when the vehicle travels in city areas or passes other vehicles; that is, it is an auxiliary light beam applying unit. The headlamp unit 4 includes a reflector 21 whose inner wall is a reflecting surface (mirror) 20 shaped in the form of an ellipsoid of revolution, a supporting cylinder 22 with both ends open and secured to the front opening of the reflector 21, for instance, by welding, a projecting lens 23 fixedly fitted in the front opening of the supporting cylinder 22, an auxiliary light beam applying bulb 24 mounted in the reflector 21, and a shade 26 mounted in the supporting cylinder 22 through a base 25. The left headlamp unit 4 is located in the lamp housing 3 on the left side, close to the rear end. The headlamp unit 4 can be swung vertically and horizontally by an aiming mechanism 27, that is, its angle can be freely adjusted.

The bulb 24 is inserted into a bulb inserting hole 30 formed in the central portion of the rear wall of the reflector 21 in such a manner that its filament (not shown) is positioned at a first focal point $P_1$ of the reflecting 20. The mirror 20 has a second focal point $P_2$ substantially at the center of the upper surface of the shade 26.

The projecting lens 23 is circular as viewed from the front. The rear surface is substantially flat, and the front surface is curved outward. The projecting lens 23 has a flange 31 along its periphery. The flange 31 is engaged with an engaging edge 32 formed along the front opening of the supporting cylinder 22 so that the lens 23 is supported by the latter. The projecting lens 23 is positioned near and in front of the second focal point Pz of the reflector 21.

The output light of the bulb 24 is applied to the reflector 21. Rays of light 35 reflected from the reflecting surface 20 gather at the second focal point $P_2$ and pass through the projecting lens 23, as a result of which they advance as parallel rays substantially parallel to the optical axis, thus passing through the curved portion 12 of the lens cover 10.

Figure 4:
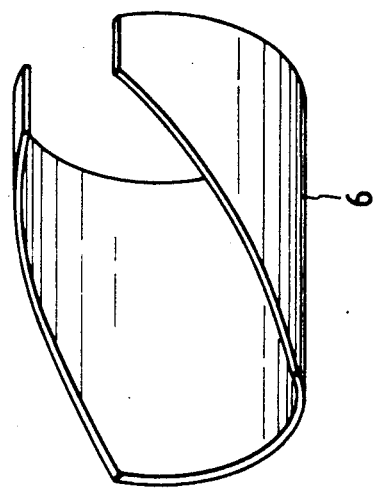
FIG. 4 is a perspective view of a shade in the vehicle headlamp of the invention.

The aforementioned shade 26 cuts part of the output rays of the light from the bulb 24, thereby providing a light distribution characteristic such that, with respect to the optical axis, only the lower half and a part of the upper right are bright. The shade 26, as shown in FIG. 4, is composed of a horizontal base part 26 and a light shielding part 26B in the form of an arcuate wall which extends upward from the front edge of the horizontal base part 26A. The horizontal base part 26A is fixedly secured to the base 25 with screws.

Figure 5:
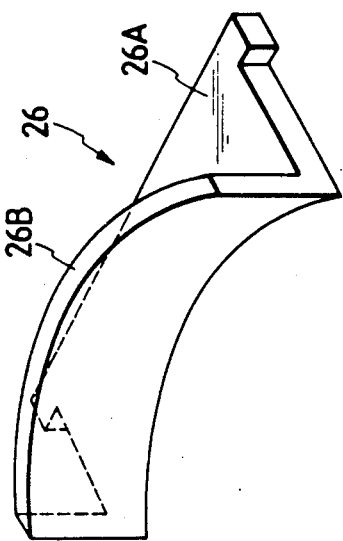
FIG. 5 is a perspective view showing an extension employed in the vehicle headlamp according to the invention.

The extension 6 is cylindrical as shown in FIG. 5. That is, the extension 6 is in the form of a cylinder which is cut longitudinally so that it is C-shaped as viewed from the front. The extension 6 is mounted on a bracket 33 which is mounted in a the lamp housing 3 with screws 34 in such a manner that the extension extends substantially horizontally and in the axial direction of the headlamp. The extension 6 is provided to lead the light passed through the projecting lens 24 to the curved portion 12. The front end portion of the extension, which confronts the curved portion 12 of the lens cover 10, is cut sloped forward at an angle substantially equal to the angle of inclination of the vehicle body 10. The curved portion 12 is substantially the same in size as the effective light distribution region (the area of irradiation on the inner wall of the vehicle body 2) defined by the projecting lens 23.

Figure 6:
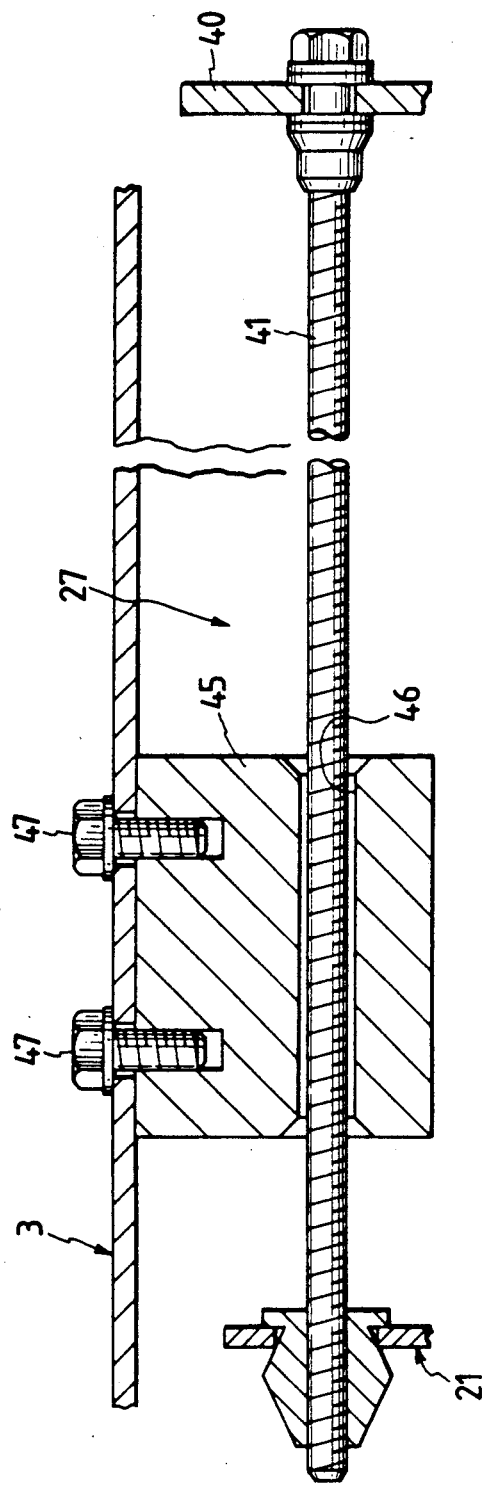
FIG. 6 is a sectional view showing an aiming mechanism in the vehicle headlamp of the invention.

The aiming mechanism 27 of the headlamp unit 4 includes a pair of horizontal adjustment aiming screws 41 disposed between the rear panel 40 of the lamp housing 3 and both end portions of the upper part of the reflector 21, a vertical adjustment aiming screw 42 disposed between the rear board 40 of the lamp housing 3 and the right end portion of the lower part of the reflector 21, and nuts 44 mounted on the periphery of the front opening of the reflector and engaged with the front end portions of the aiming screws 41 and 42. The reflector 21, having the reflecting surface in the form of an ellipsoid of revolution, is relatively deep. A space is provided between the rear panel 40 and the reflector 21 to accommodate a bulb socket 43 (FIG. 1). Accordingly, the aiming screws 41 and 42 are necessarily long. Therefore, as shown in FIG. 6, the front end portion of each of the aiming screws (only the aiming screw 41 is shown) is inserted into an inserting hole 46 formed in a holding member 45, thereby to prevent the bending of the aiming screw and the dropping of the lamp unit 4 under its own weight. The holding member 45 is fixedly secured to the upper portion of the lamp housing 3 with bolts 47. As one of the aiming screws 41 is turned from behind to move back and forth, the headlamp unit 4 is swung horizontally with the other aiming screw 41 as a fulcrum, whereby the angle of horizontal irradiation of the headlamp unit 4 is adjusted. In this adjustment, it is necessary to loosen the lower aiming screw 42 in advance. On the other hand, when the aiming screw 42 is turned to move back and forth, the headlamp unit 4 is swung vertically about the line connecting the right and left aiming screws 41 and 41 so that the angle of vertical irradiation of the headlamp unit is adjusted.

The right headlamp unit 5 is disposed in the lamp housing on the right side, close to the rear end. The headlamp unit is used a mainly when the vehicle travels at high speed, thus providing a main light beam irradiating unit. The right headlamp unit 5, like the left headlamp unit 4, includes a reflector 50 whose inner wall is a reflecting surface 51 shaped in the form of an ellipsoid of revolution, a supporting cylinder 52 open at both ends and fixedly secured to the front opening of the reflector 50, a projecting lens 53 fitted in the front opening of the supporting cylinder 52, and a main light beam applying bulb 54 disposed in the reflector 50. An aiming mechanism 55 constituted by three aiming screws 60, 60 and 61 and the nuts 63 thereof is mounted in the lamp housing so as to permit adjustment of the angle of the headlamp unit 5 horizontally and vertically. The left aiming screw 60 is longer than the right one 60, and therefore it is supported by a holding member 64 at the middle. Similarly as in the case of the above-described supporting members 45, the holding member 64 is fixedly secured to the upper portion of the lamp housing 3 and has an inserting hole into which the aiming screw 60 is inserted.

The right headlamp unit 5 (including the aiming mechanism) is similar in construction to the left headlamp unit 4 except that no shade (26) is provided for the right headlamp unit 5. The right extension 7 is similar in configuration to the left extension 6 described above, and it is held horizontal on a bracket 58 which is fixedly mounted in the lamp housing 3.

When the headlamp units 4 and 5 are mounted in the vehicle body, the openings 8 and 9 are covered with the lens cover 10. Therefore, the headlamp 1 according to the invention is an aerodynamic type headlamp having a small thickness. Furthermore, in the lens cover, the curved portions 12 and 13 are defined by the annular walls 14 which serve as ribs, as a result of which the lens cover 10 is increased in mechanical strength. Hence, the lens cover 10 is protected from damage without increasing its wall thickness and without the provision of ribs.

As described above, in the vehicle headlamp according to the invention, the front opening of the lamp housing is covered with the transparent lens cover which slopes forward, and the portions of the lens cover which correspond to the effective light distribution regions of the projecting lenses are formed into the curved portions which are surrounded by the annular walls. The curved portions and the annular walls serve as ribs to reinforce the lens cover. Hence, the lens cover is increased in mechanical strength without increasing its wall thickness, thus protecting the lens cover from damage. Thus, the technical concept of the invention can be effectively applied to an aerodynamic type headlamp. In addition, the provision of the extensions in front of the projecting lamps minimizes the loss of light, providing excellent light distribution characteristics.

What is claimed is:

1. A vehicle headlamp, comprising:
   a lamp housing;
   a reflector mounted in said lamp housing;
   a projecting lens provided in front of said reflector near a light gathering region of said reflector; and
   a transparent lens cover sloping forward disposed in front of said projecting lens, said transparent lens cover lying across an optical axis of said reflector and covering a front opening of said lamp housing, said lens cover having an upper surface portion sloping along an inner surface of a vehicle body; a curved portion corresponding in area to an effective light distribution region defined by said projecting lens; and annular wall extending from said upper surface portion of said lens cover so as to reinforce said lens cover, said curved portion being integral with and surrounded by said annular wall, and said annular wall extending through an opening in said vehicle body; a front surface portion extending substantially vertically from a front edge of said upper surface portion; and a lower surface portion extending horizontally rearward from a lower edge of said front surface portion.

2. The vehicle lamp as claimed in claim 1, further comprising an extension disposed inside said lens cover and in front of said projecting lens, said extension being in the form of a cylinder with both ends open, a front end portion of which is cut obliquely with respect to said optical axis from above.

3. The vehicle headlamp as claimed in claim 1, wherein said curved portion is elliptical in plan view.

4. The vehicle headlamp as claimed in claim 1, wherein a height of said annular wall is substantially the same as a wall thickness of said vehicle body.

5. The vehicle headlmap as claimed in claim 4, further comprising a light shielding film covering portions of said lens cover other than said curved portion.

6. A vehicle headlamp, comprising:
   a lamp housing;
   a reflector mounted in said lamp housing;
   a projecting lens provided in front of said reflector near a light gathering region of said reflector;
   a supporting cylinder having a rear end coupled to a front end of said reflector and a front end supporting said projecting lens;
   a shade fixed to an inner surface of said supporting cylinder, said shade having an upper surface located substantially at a second focus of said reflector; and
   a transparent lens cover sloping forward disposed in front of said projecting lens, said transparent lens cover lying across an optical axis of said reflector and covering a front opening of said lamp housing, said lens cover having a curved portion corresponding in area to an effective light distribution region defined by said projecting lens, and an annular wall extending from a surface of said lens cover so as to reinforce said lens cover, said curved portion being integral with and surrounded by said annular wall, and said annular wall extending through an opening in a body of a vehicle.

7. The vehicle headlamp as claimed in claim 6, further comprising an aiming mechanism for adjusting a position of said reflector, supporting cylinder and projecting lens in horizontal and vertical directions.

8. The vehicle headlamp as claimed in claim 6, wherein said aiming mechanism comprises first adjusting screw means for adjusting a position of said reflector, supporting cylinder and projecting lens in said horizontal direction, and second adjusting screw means for adjusting a position of said reflector, supporting cylinder and projecting lens in said vertical direction.

9. The vehicle headlamp as claimed in claim 8, further comprising a holding member for supporting one screw of each of said first and second adjusting screw means.

10. A vehicle headlamp comprising:
    a lamp housing;
    a reflector mounted in said lamp housing;
    a projecting lens provided in front of said reflector near a light gathering region of said reflector;
    a transparent lens cover sloping forward disposed in front of said projecting lens, said transparent lens cover lying across an optical axis of said reflector and covering a front opening of said lamp housing, said lens cover having a curved portion corresponding in area to an effective light distribution region defined by said projecting lens, and an annular wall extending from a surface of said lens cover so as to reinforce said lens cover, said curved portion being integral with and surrounded by said annular wall, and said annular wall extending through an opening in a body of a vehicle; and
    an extension disposed inside said lens cover and in front of said projecting lens, said extension being in the form of a cylinder with both ends open, a front end portion of which is cut obliquely with respect to said optical axis from above.

11. The vehicle headlamp as claimed in claim 10, wherein said lens cover further comprises an upper surface portion sloping along an inner surface of a vehicle body, a front surface portion extending substantially vertically from a front edge of said upper surface portion, and a lower surface portion extending horizontally rearward from a lower edge of said front surface portion.

12. The vehicle headlamp as claimed in claim 10, wherein said curved portion is ellpitcal in plan view.

13. The vehicle headlamp as claimed in claim 12, wherien a height of said annular wall is substantially the same as a wall thickness of said vehicle body.

14. The vehicle headlamp as claimed in claim 13, further comprising a light shielding film covering portions of said lens cover other than said curved portion.

15. The vehicle headlamp as claimed in claim 10, further comprising a supporting cylinder having a rear end coupled to a front end of said reflector and a front end supporting said projecting lens.

16. The vehicle headlamp as claimed in claim 15, further comprising a shade fixed to an inner surface of said supporting cylinder, said shade having an upper surface located substantially at a second focus of said reflector.

17. The vehicle headlamp as claimed in claim 15, further comprising an aiming mechanism for adjusting a position fo said reflector, supporting cylinder and projecting lens in horizontal and vertical directions.

18. The vehicle headlamp as claimed in claim 17, wherein said aiming mechanism comprises first adjusting screw means for adjusting a position of said reflector, supporting cylinder and projecting lens in said horizontal direction, and second adjusting screw means for adjusting a position of said reflector, supporting cylinder and projecting lens in said vertical direction, and comprising a holding member for supporting one screw of each of said first and second adjusting screw means.

* * * * *